(12) United States Patent
Nakajima et al.

(10) Patent No.: US 8,818,674 B2
(45) Date of Patent: Aug. 26, 2014

(54) VEHICLE BEHAVIOR CONTROLLER

(75) Inventors: Kenji Nakajima, Chiyoda-ku (JP); Masato Mori, Chiyoda-ku (JP); Kenichi Akita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 332 days.

(21) Appl. No.: 12/429,641

(22) Filed: Apr. 24, 2009

(65) Prior Publication Data

US 2010/0087974 A1 Apr. 8, 2010

(30) Foreign Application Priority Data

Oct. 7, 2008 (JP) ................................. 2008-260453

(51) Int. Cl.
*B60T 8/24* (2006.01)
*B60W 10/18* (2012.01)
*H02P 29/00* (2006.01)

(52) U.S. Cl.
USPC ........... 701/72; 701/48; 180/65.285; 318/801

(58) Field of Classification Search
USPC ........... 701/22, 36, 48, 51, 53, 54, 70, 72, 94, 701/99; 903/947, 903; 280/88, 772; 180/170, 172, 175, 178, 65.1, 685.21, 180/65.265, 65.285, 65.31
See application file for complete search history.

(56) References Cited

U.S. PATENT DOCUMENTS

| | | | | |
|---|---|---|---|---|
| 5,801,497 A | * | 9/1998 | Shamoto et al. | 318/139 |
| 5,914,582 A | * | 6/1999 | Takamoto et al. | 318/801 |
| 6,239,566 B1 | * | 5/2001 | Tareilus et al. | 318/379 |
| 6,686,719 B2 | * | 2/2004 | Cochoy et al. | 318/801 |
| 7,368,889 B2 | * | 5/2008 | Youm et al. | 318/801 |
| 8,054,014 B2 | * | 11/2011 | Rehm et al. | 318/376 |
| 8,483,896 B2 | * | 7/2013 | Miyazaki et al. | 701/22 |
| 2002/0084766 A1 | * | 7/2002 | Schwesig | 318/801 |

(Continued)

FOREIGN PATENT DOCUMENTS

| | | |
|---|---|---|
| DE | 10 2006 046 093 A1 | 4/2008 |
| JP | 10-310397 A | 11/1998 |
| JP | 11-324756 A | 11/1999 |
| JP | 2005-137099 A | 5/2005 |
| JP | 2006-321397 A | 11/2006 |

OTHER PUBLICATIONS

Arai et al. JP 11-324756, Pub. Nov. 26, 1999, Honda Motor Co. Ltd. Specification Computer English Translation.*

(Continued)

*Primary Examiner* — Karen Beck
(74) *Attorney, Agent, or Firm* — Sughrue Mion, PLLC; Richard C. Turner

(57) ABSTRACT

Provided is a vehicle behavior controller capable of stabilizing a behavior of a vehicle with a high response when an unstable state of the vehicle is judged. The vehicle behavior controller includes: a running state detecting unit for detecting a running state of the vehicle; an unstable state judging unit for judging the unstable state of the vehicle based on the running state; a motor generator connected to an engine of the vehicle, the motor generator operating as a power generator for using an output of a prime mover to generate power and an electric motor for assisting the output of the prime mover; and a control unit for controlling an operation of the motor generator based on r.p.m. of the motor generator, in which the control unit controls the operation of the motor generator to generate braking torque when the unstable state is judged.

1 Claim, 4 Drawing Sheets

(56) References Cited

U.S. PATENT DOCUMENTS

| | | | |
|---|---|---|---|
| 2003/0057003 A1* | 3/2003 | Kawada et al. | 180/65.1 |
| 2003/0230933 A1 | 12/2003 | Schneider et al. | |
| 2005/0211478 A1* | 9/2005 | Sakuma et al. | 180/65.1 |
| 2007/0249461 A1* | 10/2007 | Tsuji et al. | 477/3 |
| 2010/0138117 A1 | 6/2010 | Witte | |
| 2010/0181949 A1* | 7/2010 | Bates et al. | 318/400.09 |
| 2011/0155486 A1* | 6/2011 | Iwaki et al. | 180/65.1 |
| 2012/0089290 A1* | 4/2012 | Kato et al. | 701/22 |
| 2013/0046426 A1* | 2/2013 | Tsukashima et al. | 701/22 |
| 2013/0311026 A1* | 11/2013 | Endo et al. | 701/22 |

OTHER PUBLICATIONS

Katsuhama et al. JP 2006-321397, Nov. 30, 2006, Hitachi Ltd. Specification Computer English Translation.*
Katsuhama et al. JP 2006-321397, Nov. 30, 2006, Hitachi Ltd. Claims Computer English Translation.*
JP2005-137099 English translation.*
French Search Report and Written Opinion dated May 29, 2013 issued in French Patent Application No. 0953916.

* cited by examiner

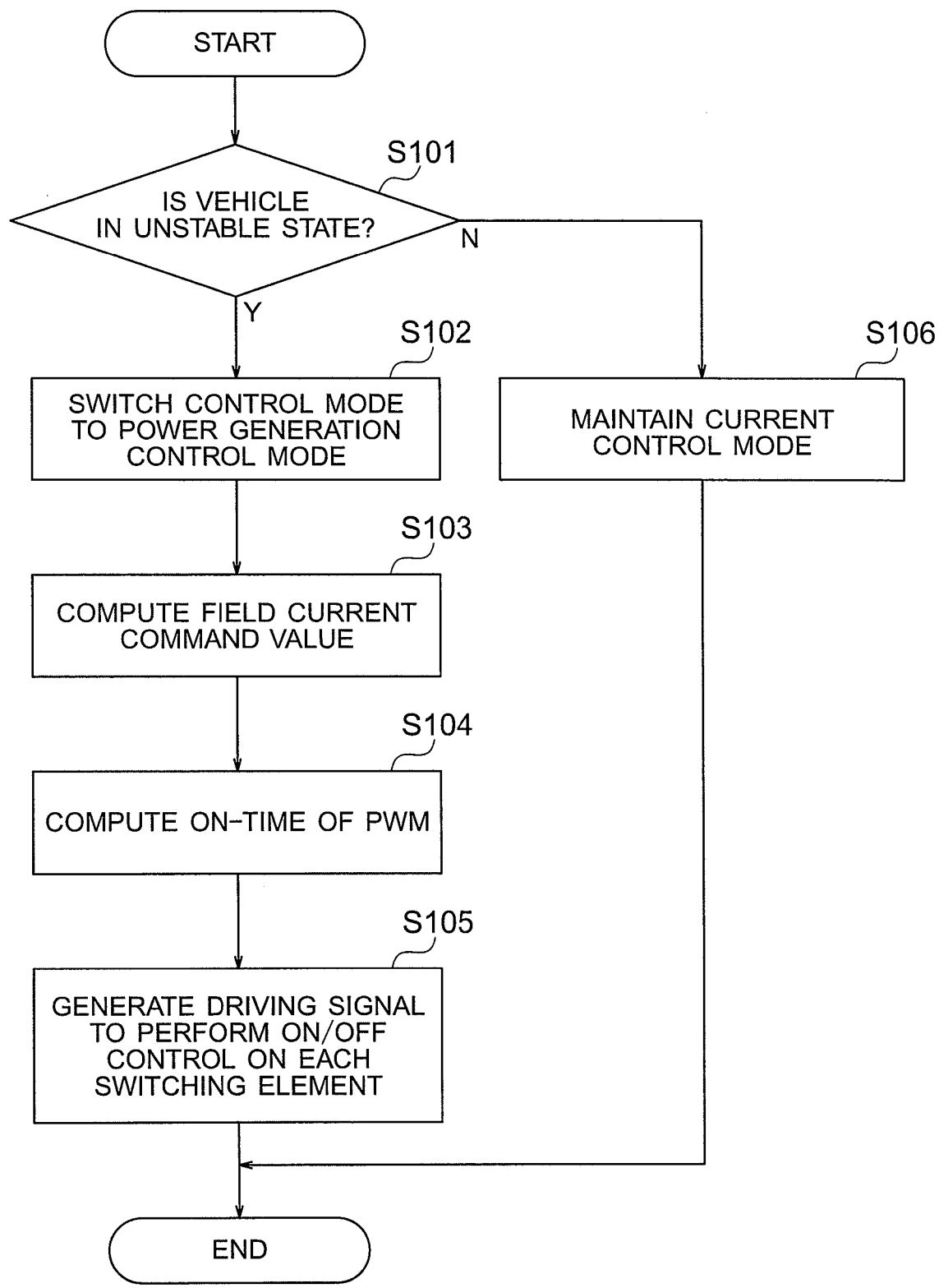

VEHICLE BEHAVIOR CONTROLLER

BACKGROUND OF THE INVENTION

1. Field of the Invention

The present invention relates to a vehicle behavior controller for controlling a behavior according to a running state of a vehicle.

2. Description of the Related Art

As a conventional vehicle behavior controller, there is known a vehicle behavior controller for judging an unstable state of a vehicle based on actual road surface reaction torque generated for a tire of the vehicle and reference road surface reaction torque, and when the unstable state is judged, reducing a driving force of the vehicle to decelerate the vehicle. As means for reducing the driving force of the vehicle, there are provided means for reducing an engine output, means for switching a transmission gear ratio of a transmission, and means for reducing a motor output (for example, see JP 2008-081006 A).

However, the prior art has the following problem.

In the conventional vehicle behavior controller, the driving force of the vehicle is reduced when the unstable state of the vehicle is judged. However, in particular, an engine and the transmission have a poor response. Therefore, there arises a problem that a long period of time is required to decelerate the vehicle by controlling the engine or the transmission to reduce the driving force of the vehicle after the judgment of the unstable state of the vehicle.

SUMMARY OF THE INVENTION

The present invention has been made to solve the problem as described above, and it is an object of the present invention to provide a vehicle behavior controller capable of stabilizing a behavior of a vehicle with a high response when an unstable state of the vehicle is judged.

A vehicle behavior controller according to the present invention includes: running state detecting means for detecting a running state of a vehicle; unstable state judging means for judging an unstable state of the vehicle based on the running state; a motor generator connected to a prime mover of the vehicle, the motor generator operating as a power generator for using an output of the prime mover to generate power and an electric motor for assisting the output of the prime mover; and control means for controlling an operation of the motor generator based on r.p.m. of the motor generator, in which the control means controls the operation of the motor generator so as to generate braking torque when the unstable state is judged.

According to the vehicle behavior controller of the present invention, the control means controls the operation of the motor generator connected to the prime mover of the vehicle to generate the braking torque when the unstable state judging means judges the unstable state of the vehicle. As a result, the braking torque directly acts on the prime mover to decelerate the vehicle.

Thus, the vehicle behavior controller capable of stabilizing the behavior of the vehicle with a high response when the unstable state of the vehicle is judged can be obtained.

BRIEF DESCRIPTION OF THE DRAWINGS

In the accompanying drawings:

FIG. 4 is a flowchart illustrating an operation of the vehicle behavior controller according to the first embodiment of the present invention.

DETAILED DESCRIPTION OF THE PREFERRED EMBODIMENT

Figure 1:
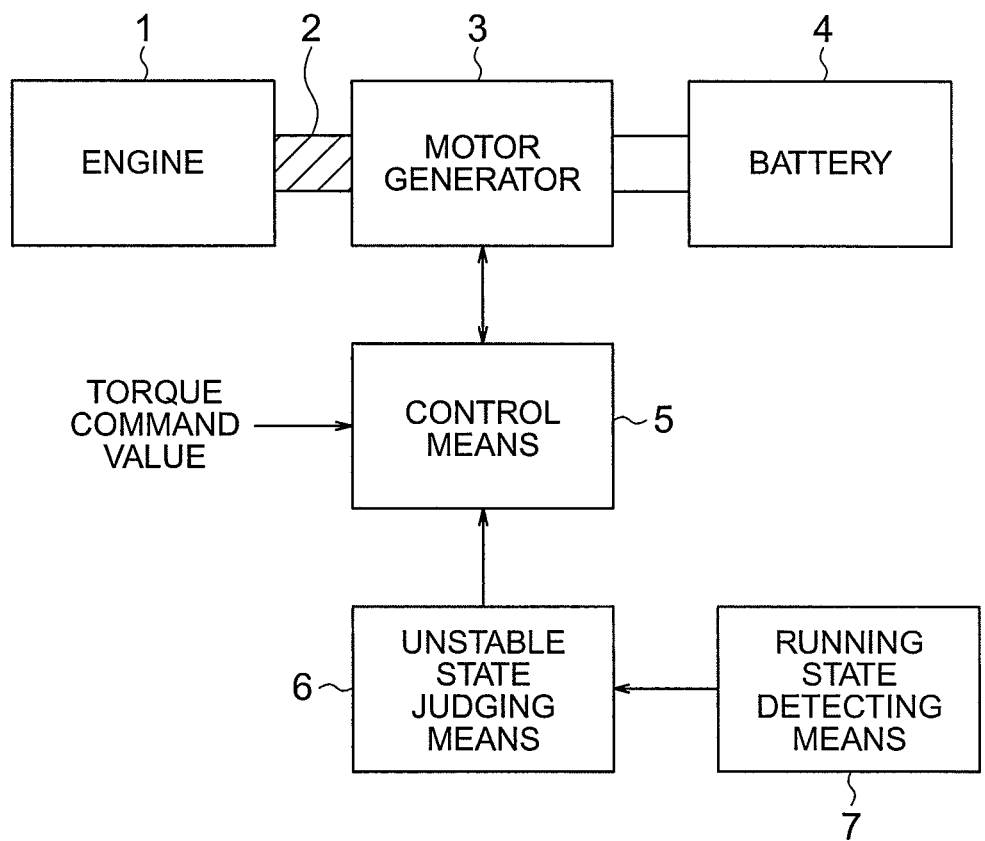
FIG. 1 is a configuration diagram illustrating an entire system including a vehicle behavior controller according to a first embodiment of the present invention.

Hereinafter, an embodiment of the present invention is described referring to the accompanying drawings. In each of the drawings, the same or equivalent part is denoted by the same reference numeral for the description.

The case where a prime mover is an engine is taken as an example for the description in the following embodiment, but the prime mover is not limited thereto. The prime mover may be a motor or the like.

First Embodiment

FIG. 1 is a configuration diagram illustrating the entire system including a vehicle behavior controller according to a first embodiment of the present invention.

In FIG. 1, a motor generator 3 operating both as an electric motor and a power generator is connected to an engine 1 through a belt 2 serving as power transmission means for transmitting an output of the engine 1.

A battery 4 is connected to the motor generator 3. After electric energy, which is generated from the motor generator 3 by driving the engine 1, is subjected to AC-DC conversion, the battery 4 is charged with the obtained DC current.

Moreover, control means 5 for outputting a driving signal to control an operation of the motor generator 3 is also connected to the motor generator 3.

Unstable state judging means 6 is connected to the control means 5. Running state detecting means 7 is connected to the unstable state judging means 6. The unstable state judging means 6 and the running state detecting means 7 correspond to functions of the other engine control unit (ECU) mounted in a vehicle, and communicate with the control means 5 by using a vehicle-mounted communication such as a controller area network (CAN).

A torque command value corresponding to a command value of braking torque is input from, for example, a higher-level controller through the vehicle-mounted communication such as the CAN. The case where the torque command value is input through the CAN is described in the first embodiment, but the communication means is not limited thereto. Other known communication means may be used.

The running state detecting means 7 detects a running state of the vehicle. Specifically, the running state detecting means 7 is a sensor or the like, which detects road surface reaction torque generated for a tire of the vehicle, a gripping force of the tire, or a yaw rate and a lateral acceleration.

A method of detecting the running state of the vehicle is described in JP 2008-081006 A cited above and the like, and therefore the description thereof is herein omitted.

The unstable state judging means 6 judges an unstable state of the vehicle based on the running state detected by the running state detecting means 7. Specifically, the unstable state judging means 6 judges whether or not the vehicle is in the unstable state such as an understeer state or an oversteer state based on the road surface reaction torque, the gripping force of the tire, and the yaw rate and the lateral acceleration, which are detected by the sensor or the like. Then, the unstable state judging means 6 outputs a judgment signal.

A method of judging the unstable state of the vehicle is described in JP 2008-081006 A cited above and the like, and therefore the description thereof is herein omitted. The method of judging the unstable state of the vehicle is not limited to that described above, and other known judging methods may be used.

In normal times, the control means 5 generates a driving signal based on the r.p.m. of the motor generator 3 or the like to control the operation of the motor generator 3.

When the judgment signal indicating that the vehicle is in the unstable state is input from the unstable state judging means 6, the control means 5 generates the driving signal to cause the motor generator 3 to generate the braking torque based on the torque command value input from the higher-level controller, thereby controlling the operation of the motor generator 3. The higher-level controller computes the torque command value based on, for example, a vehicle speed of the vehicle or the like.

Figure 2:
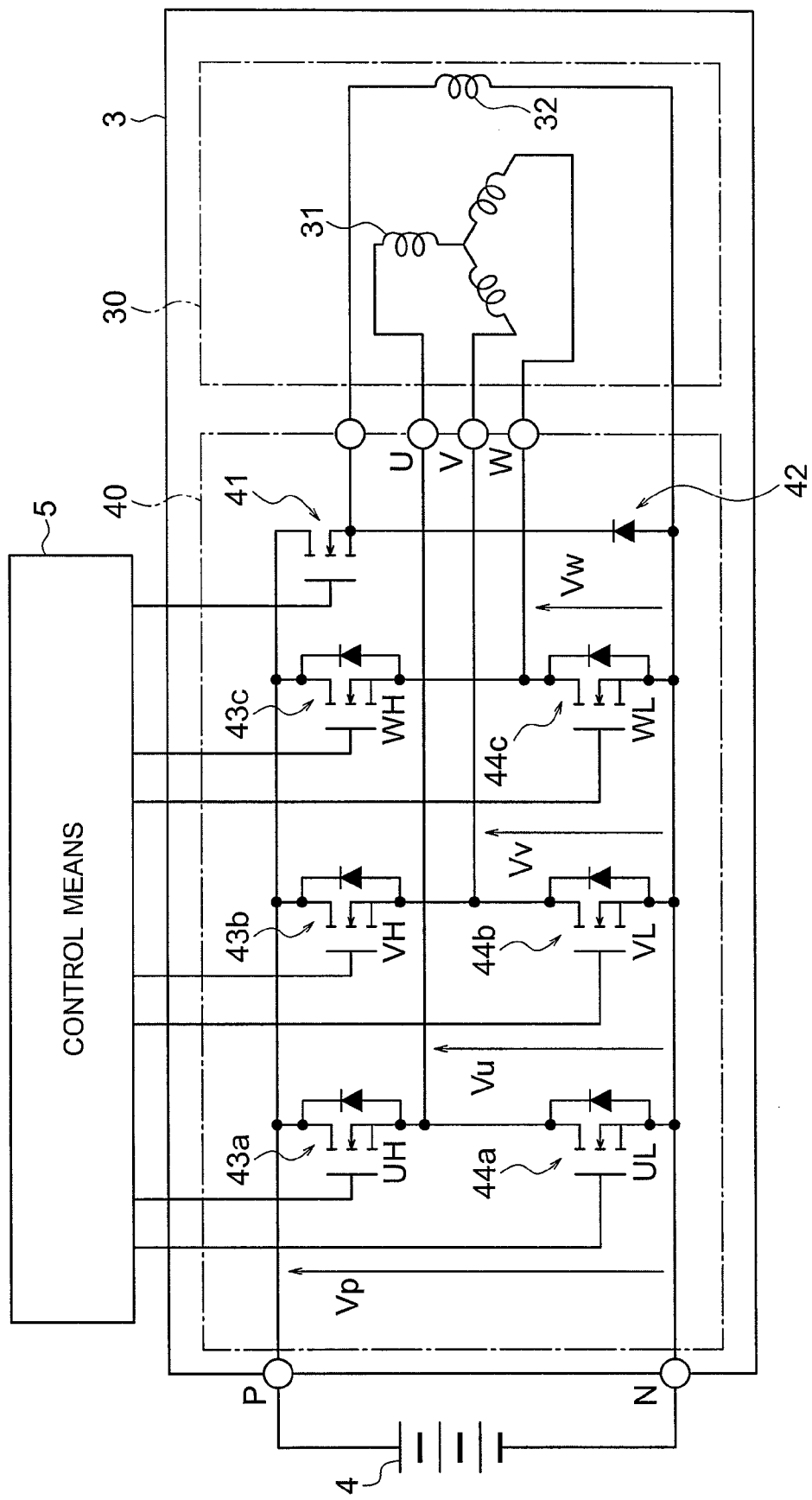
FIG. 2 is a configuration diagram illustrating a motor generator according to the first embodiment of the present invention together with a battery and control means.

FIG. 2 is a configuration diagram illustrating the motor generator 3 according to the first embodiment of the present invention together with the battery 4 and the control means 5.

In FIG. 2, the motor generator 3 includes an electric motor section 30 and a power conversion section 40 which are connected to each other. The battery 4 and the control means 5 are connected to the power conversion section 40.

A configuration including the control means 5 for controlling the operation of the motor generator 3, and the electric motor section 30 and the power conversion section 40, which are formed in an integrated fashion, may be treated as the motor generator. Further, the motor generator may include the electric motor section 30 and the power conversion section 40, which are physically separated from each other.

The electric motor section 30 includes a three-phase (U-phase, V-phase, and W-phase) armature winding 31 and a field winding 32 which is provided to oppose the armature winding 31. In other words, the motor generator 3 is a three-phase field winding type motor generator.

The number of phases of the armature winding 31 is not limited to three, and the other number of phases may be used.

The power conversion section 40 includes a field switching element 41, a free wheel diode 42, three-phase upper arm switching elements 43, and three-phase lower arm switching elements 44.

The field switching element 41 and the free wheel diode 42 perform PWM control on a field current flowing through the field winding 32.

The three-phase upper arm switching elements 43 include a U-phase upper switching element 43a, a V-phase upper switching element 43b, and a W-phase upper switching element 43c, each being formed of a transistor and a diode (including a parasitic component). Each of U-phase, V-phase, and W-phase terminals of the electric motor section 30 and a P-terminal corresponding to a positive power input from the battery 4 are connected to each other through the three-phase upper arm switching elements 43.

The three-phase lower arm switching elements 44 include a U-phase lower switching element 44a, a V-phase lower switching element 44b, and a W-phase lower switching element 44c, each being formed of a transistor and a diode (including a parasitic component). Each of the U-phase, V-phase, and W-phase terminals of the electric motor section 30 and an N-terminal corresponding to a ground input from the battery 4 are connected to each other through the three-phase lower arm switching elements 44.

When the motor generator 3 operates as the electric motor, the power conversion section 40 converts DC power from the battery 4 into AC power by an ON/OFF operation of each of the switching elements (field switching element 41, three-phase upper arm switching elements 43, and three-phase lower arm switching elements 44), thereby driving the electric motor section 30.

On the other hand, when the motor generator 3 operates as the power generator, the power conversion section 40 rectifies the AC power generated by the electric motor section 30 into the DC power to charge the battery 4 with the obtained DC power.

In this operation, the ON/OFF operation of each of the switching elements (field switching element 41, three-phase upper arm switching elements 43, and three-phase lower arm switching elements 44) is controlled by the driving signal from the control means 5.

Figure 3:
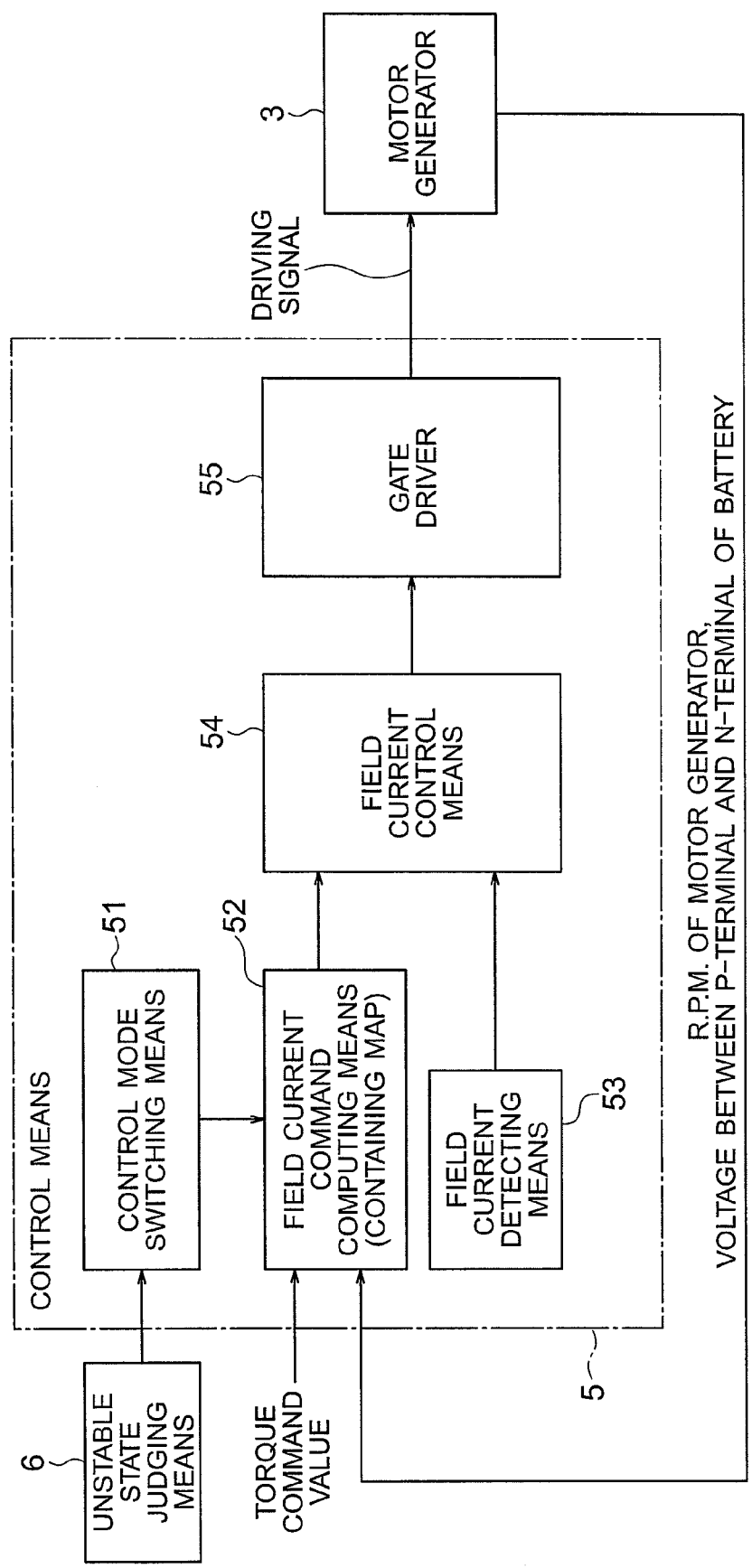
FIG. 3 is a block configuration diagram illustrating the control means according to the first embodiment of the present invention.

FIG. 3 is a block configuration diagram illustrating the control means 5 according to the first embodiment of the present invention.

In FIG. 3, the control means 5 includes control mode switching means 51, field current command computing means 52, field current detecting means 53, field current control means 54, and a gate driver 55.

The control means 5 has various functions as control means other than those illustrated in FIG. 3, but only the parts related to the present invention are illustrated in FIG. 3.

Next, a function of each of the parts of the control means 5 is described.

In normal times, the control mode switching means 51 switches a control mode of the motor generator 3 based on the r.p.m. of the motor generator 3 and a control mode switching signal (not shown), or the communication with the higher-level controller. The control mode includes a drive control mode, a power generation control mode, a short-brake control mode, and a standby mode.

When the judgment signal indicating that the vehicle is in the unstable state is input from the unstable state judging means 6, the control mode switching means 51 switches the current control mode to the power generation control mode. This switching serves to perform the power generation with diode rectification or with synchronous rectification to generate power generation torque, thereby applying the braking torque to the engine 1.

The field current command computing means 52 computes a command value (field current command value) of the field current for energizing the field winding 32 when the control mode is switched to the power generation control mode by the control mode switching means 51. Specifically, the field current command computing means 52 computes the field current to be used for the energization from a map prestored in the field current command computing means 52 based on the torque command value from the higher-level controller, the r.p.m. of the motor generator 3, and a voltage between the P-terminal and the N-terminal of the battery 4. Then, the field current command computing means 52 outputs the calculated field current as the field current command value.

The map shows the relation among generated torque obtained in advance by experiment or the like, the r.p.m. of the motor generator 3, the voltage between the P-terminal and the N-terminal of the battery 4, and the field current.

The field current detecting means 53 detects the field current flowing through the field winding 32.

The field current control means 54 performs feedback control to cause the field current detected by the field current detecting means 53 to follow the field current command value output from the field current command computing means 52, computes an ON time of PWM, and outputs the obtained ON time to the gate driver 55.

The gate driver 55 generates the driving signal based on the ON time of the PWM, which is output from the field current control means 54, to perform ON/OFF control for each of the switching elements (field switching element 41, three-phase upper arm switching elements 43, and three-phase lower arm switching elements 44) of the power conversion section 40. In this manner, the field current is allowed to flow through the field winding 32 to obtain desired braking torque corresponding to the torque command value.

When the r.p.m. of the motor generator 3 is small to prevent a sufficient amount of generated power from being ensured as in the case of a low induced voltage generated on the three-phase AC side or a high voltage between the P-terminal and the N-terminal of the battery 4, the three-phase lower arm switching elements 44 are turned ON to short-circuit the armature winding 31 (in the short-brake control mode). In this manner, the braking torque can be generated.

Also in this case, by setting the field current command value based on the torque command value from the higher-level controller, the r.p.m. of the motor generator 3, and the voltage between the P-terminal and the N-terminal of the battery 4, desired braking torque can be obtained.

Next, referring to a flowchart of FIG. 4, an operation of the vehicle behavior controller according to the first embodiment of the present invention is described.

First, the unstable state judging means 6 judges whether or not the vehicle is in the unstable state such as the understeer state or the oversteer state based on the running state detected by the running state detecting means 7 (Step S101).

When it is judged in Step S101 that the vehicle is in the unstable state (specifically, Yes), the control mode switching means 51 switches the current control mode to the power generation control mode (Step S102).

Subsequently, the field current command computing means 52 computes the field current command value based on the torque command value from the higher-level controller, the r.p.m. of the motor generator 3, and the voltage between the P-terminal and the N-terminal of the battery 4 (Step S103).

Next, the field current control means 54 performs the feedback control to cause the field current detected by the field current detecting means 53 to follow the field current command value from the field current command computing means 52, and computes the ON time of the PWM (Step S104).

Subsequently, the gate driver 55 generates the driving signal based on the ON time of the PWM from the field current control means 54 to control ON/OFF of each of the switching elements (field switching element 41, three-phase upper arm switching elements 43, and three-phase lower arm switching elements 44) of the power conversion section 40 (Step S105). Then, the processing illustrated in FIG. 4 is terminated.

On the other hand, when it is judged in Step S101 that the vehicle is not in the unstable state (specifically, No), the current control mode is maintained (Step S106). Then, the processing illustrated in FIG. 4 is terminated.

In the manner as described above, the field current command value is computed based on the torque command value to perform the feedback control on the field current. As a result, desired braking torque can be obtained.

According to the vehicle behavior controller of the first embodiment of the present invention, when the unstable state of the vehicle is judged by the unstable state judging means, the control means switches the control mode to the power generation control mode or the short-brake control mode to cause the motor generator to generate the braking torque, and then, applies the generated braking torque to the motor. As a result, the braking torque directly acts on the motor to decelerate the vehicle.

Therefore, when the unstable state of the vehicle is judged, the behavior of the vehicle can be stabilized with a high response.

Moreover, the power generation control of the motor generator allows the recovery of electric energy generated at the time of braking.

Moreover, the short-brake control of the motor generator allows the motor generator to generate the braking torque even when the power generation control cannot be performed.

Further, by controlling the braking torque based on the externally input torque command value, that is, by computing the field current command value based on the torque command value to perform the feedback control on the field current, desired braking torque can be obtained.

The power generation control has been described as the power generation with diode rectification or with synchronous rectification in the first embodiment described above, but the power generation control is not limited thereto. Inverter power generation for raising the induced voltage generated on the three-phase AC side by chopper control may also be performed. Other methods can also be used as long as the braking torque can be obtained by the power generation control.

Further, in the first embodiment described above, the field current command value is computed by the map computation based on the torque command value from the higher-level controller to perform the feedback control on the field current, thereby obtaining desired braking torque. However, the feedback control may also be performed on the torque. The feedback control may be performed to cause the braking torque to follow the torque command value from the higher-level controller.

What is claimed is:
1. A vehicle behavior controller comprising:
a running state detecting unit configured to detect a running state of a vehicle;
an unstable state judging unit configured to judge an unstable state of the vehicle based on the running state;
a motor generator connected to a prime mover of the vehicle, the motor generator operating as a power generator for using an output of the prime mover to generate power and an electric motor for assisting the output of the prime mover; and
a control means for controlling an operation of the motor generator based on r.p.m. of the motor generator,
wherein:
the unstable state judging unit judges the unstable state when the vehicle is in one of an understeer state and an oversteer state,
the control means controls the operation of the motor generator so as to generate braking torque based on an externally input torque command value when the unstable state is judged; and
the control unit selects, based on the r.p.m. of the motor generator, whether to control power generation of the motor generator to generate the braking torque or whether to short-circuit an armature winding of the motor generator to generate the braking torque, and
the r.p.m of the motor generator, when the control unit selects to control power generation of the motor genera- tor, is higher than the r.p.m of the motor generator when the control unit selects to short-circuit an armature winding of the motor generator, the motor generator includes more than one upper arm switching elements and more than one lower arm switching elements, the upper arm switching elements being positioned above the lower arm switching elements, and the more than one lower arm switching elements are turned ON to short-circuit the armature winding as a result of the control means selecting to short-circuit the armature winding to generate the braking torque.

\* \* \* \* \*